United States Patent
Fetzer (10) Patent No.: US 8,875,013 B2
(45) Date of Patent: Oct. 28, 2014

(54) MULTI-PASS VALIDATION OF EXTENSIBLE MARKUP LANGUAGE (XML) DOCUMENTS

(75) Inventor: Stephanie A. Fetzer, Huntersville, NC (US)

(73) Assignee: International Business Machines Corporation, Armonk, NY (US)

( * ) Notice: Subject to any disclaimer, the term of this patent is extended or adjusted under 35 U.S.C. 154(b) by 1348 days.

(21) Appl. No.: 12/054,692

(22) Filed: Mar. 25, 2008

(65) Prior Publication Data

US 2009/0249186 A1 Oct. 1, 2009

(51) Int. Cl.
*G06F 17/27* (2006.01)
*G06F 17/00* (2006.01)
*G06F 17/22* (2006.01)

(52) U.S. Cl.
CPC ........ *G06F 17/2725* (2013.01); *G06F 17/2247* (2013.01)
USPC .......................................... 715/237; 715/234

(58) Field of Classification Search
USPC ................................................ 715/237, 234
See application file for complete search history.

(56) References Cited

U.S. PATENT DOCUMENTS

| | | | | |
|---|---|---|---|---|
| 5,005,200 | A * | 4/1991 | Fischer | 380/30 |
| 6,581,093 | B1 * | 6/2003 | Verma | 709/220 |
| 6,865,728 | B1 * | 3/2005 | Branson et al. | 717/108 |
| 6,871,345 | B1 * | 3/2005 | Crow et al. | 717/175 |
| 7,051,029 | B1 * | 5/2006 | Fayyad et al. | 1/1 |
| 7,296,297 | B2 * | 11/2007 | Kirkpatrick et al. | 726/30 |
| 7,992,081 | B2 * | 8/2011 | Medi et al. | 715/237 |
| 2003/0023425 | A1 * | 1/2003 | Pentheroudakis et al. | 704/9 |
| 2004/0019546 | A1 * | 1/2004 | Ta et al. | 705/35 |
| 2004/0073870 | A1 * | 4/2004 | Fuh et al. | 715/513 |
| 2004/0194057 | A1 * | 9/2004 | Schulte et al. | 717/114 |
| 2005/0027546 | A1 * | 2/2005 | Wiest et al. | 705/1 |
| 2005/0055631 | A1 * | 3/2005 | Scardina et al. | 715/513 |
| 2005/0066263 | A1 * | 3/2005 | Baugher | 715/500 |
| 2005/0138648 | A1 * | 6/2005 | Ahmed et al. | 719/328 |
| 2005/0177543 | A1 * | 8/2005 | Chen et al. | 707/1 |
| 2005/0251381 | A1 * | 11/2005 | Pentheroudakis et al. | 704/4 |
| 2006/0288285 | A1 * | 12/2006 | Lai et al. | 715/708 |
| 2007/0174763 | A1 * | 7/2007 | Chang et al. | 715/513 |
| 2007/0208868 | A1 * | 9/2007 | Kidd et al. | 709/229 |
| 2007/0250766 | A1 * | 10/2007 | Medi et al. | 715/513 |
| 2008/0046453 | A1 * | 2/2008 | Kostoulas et al. | 707/101 |
| 2008/0201365 | A1 * | 8/2008 | Petri | 707/103 X |
| 2009/0113394 | A1 * | 4/2009 | Weber et al. | 717/126 |

* cited by examiner

*Primary Examiner* — Stephen Hong
*Assistant Examiner* — Marshon Robinson
(74) *Attorney, Agent, or Firm* — Patents on Demand P.A.; Brian K. Buchheit; Scott M. Garrett (57) ABSTRACT

A validation sequence for an XML document can be identified. The validation sequence can include a set of validation elements. At least one validation pass can be performed for the XML document. Each validation pass can correspond to one of the validation elements. Each validation pass can be configured to validate the XML document for at least one condition defined by the validation element. A validation element result can be produced for each performed validation pass. A validation element result that indicates the XML document is invalid can cause an immediate ending of activities related to the validation sequence, which determines the XML document in general to be invalid. A validation element result that indicates the XML document is valid causes a validation pass to be performed for another one of the validation elements unless each validation element in the validation sequence has been processed. A successful validation of the XML document requires a performance of a successful execution pass for each of the plurality the validation elements.

20 Claims, 3 Drawing Sheets

MULTI-PASS VALIDATION OF EXTENSIBLE MARKUP LANGUAGE (XML) DOCUMENTS

BACKGROUND OF THE INVENTION

The present invention relates to the field of data validation and, more particularly, to utilizing a multi-pass technique to optimize the validation of XML documents.

The use of the Internet to conduct data transactions is becoming a standard practice. This is particularly true for businesses who rely solely on e-commerce as well as large corporations whose geographically diverse components need to share information. With the diverse amount of data and transactions that occur, standardization is a key element to ensure data integrity. Use of the extensible markup language (XML) is a popular means for standardizing data transactions. XML permits data structures to be defined and utilized within markup documents. Key information for e-commerce is often conveyed within these data structures. For example, purchase order (PO) information is often conveyed within a purchase order XML data structure.

Using a standardized language like XML does not single-handedly ensure data integrity. The data contained within the XML document must also be structurally valid, which means that the formats of the data structures of an XML document must conform to an agreed upon standard of an XML document sender and an XML document recipient.

Conventionally, XML parsers have been the traditional way to validate and report errors in XML data. Conventional XML parsers are structured for a single pass validation, where a most detailed level of processing, needed for providing a most detailed report possible is always invoked. Further, often redundant XML parsers are utilized by various networking components, where later XML parsers repeat validations previously performed by other XML parsers. XML files can be quite large, and the processing overhead for single pass validation can be significant.

BRIEF SUMMARY OF THE INVENTION

One aspect of the present invention can include a method, computer program product, system, and apparatus for validating XML documents. A validation sequence for an XML document can be identified. The validation sequence can include a set of validation elements. At least one validation pass can be performed for the XML document. Each validation pass can correspond to one of the validation elements. Each validation pass can be configured to validate the XML document for at least one condition defined by the validation element. A validation element result can be produced for each performed validation pass. A validation element result that indicates the XML document is invalid can cause an immediate ending of activities related to the validation sequence, which determines the XML document in general to be invalid. A validation element result that indicates the XML document is valid causes a validation pass to be performed for another one of the validation elements unless each validation element in the validation sequence has been processed. A successful validation of the XML document requires a performance of a successful execution pass for each of the plurality the validation elements.

One aspect of the present invention can include a method, computer program product, system, and apparatus that utilize a multi-step technique to optimize the validation of extensible markup language (XML) documents. Each of these multiple steps can be designed to be complementary and non-redundant. When an XML document is validated by an early step, subsequent validation operations are not necessarily executed. In one embodiment, different servers and/or processes can be used to perform the different validations. In one embodiment, an XML document can be received, where it is initially analyzed to determine whether it contains validly formed XML. A valid XML document can be analyzed to determine a validation sequence to be performed for that XML document. The validation sequence can define a level of validation and can include of a series of validation elements to be performed on the XML document. Next, the validation sequence can be executed on an element-by-element basis. If a validation element fails, then the execution of the validation sequence can be immediately terminated. A rejection message detailing the failure can be conveyed to the originator of the XML document. Different validation elements can be configured for different XML documents.

Another aspect of the present invention can include a multi-step validation application that optimally validates extensible markup language (XML) documents. Such an application can include a document preprocessor, a validation coordinator, and a document evaluator. The document preprocessor can be configured to analyze the XML document for preprocessing parameters. The validation coordinator can be configured to determine the validation sequence for the XML document based upon the preprocessing parameters. The validation coordinator can also monitor the execution of the validation sequence. The document evaluator can be configured to execute the validation sequence upon the XML document as directed by the validation coordinator.

DETAILED DESCRIPTION OF THE INVENTION

The present invention discloses a technique that can optimize the validation of extensible markup language (XML) documents by performing the validation in multiple steps. This multi-step technique can be represented by a validation sequence that contains a series of validation elements to be used to test the validity of the XML document. The use of a multi-step technique allows for invalid XML documents to be determined earlier in the validation process and without performing additional and unnecessary validations on the invalid XML document, which can greatly reduce the time required to validate the XML document. This technique can also allow for different types of XML documents to be validated with varied levels of stringency. Different validation actions can be performed by different servers, clients, or processing components, where the validation actions taken together form a cohesive validation sequence.

In one embodiment, the validation sequence can be formed of discrete, yet complimentary steps, having a minimum of overall redundancy. To use an example, an XML document containing purchase order details can be evaluated in a series of steps. For example, a first step can validate whether a document includes a valid XML structure based upon an XML language standard. A next step can validate whether the XML document conforms to a purchase order schema or whether it is malformed. The purchase order can be compared against a contract schema specific to a contract established between two trading partners to determine whether it is a valid purchase order under that contract.

The present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including, but not limited to the Internet, wireline, optical fiber cable, RF, etc.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. Examples of a computer-readable medium include a semiconductor or solid state memory, magnetic tape, a removable computer diskette, a random access memory (RAM), a read-only memory (ROM), an erasable programmable read-only memory (EPROM or Flash memory, a rigid magnetic disk and an optical disk. Current examples of optical disks include compact disk-read only memory (CD-ROM), compact disk-read/write (CD-R/W) and DVD. Other computer-readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer-usable or computer-readable medium can even include paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++, or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
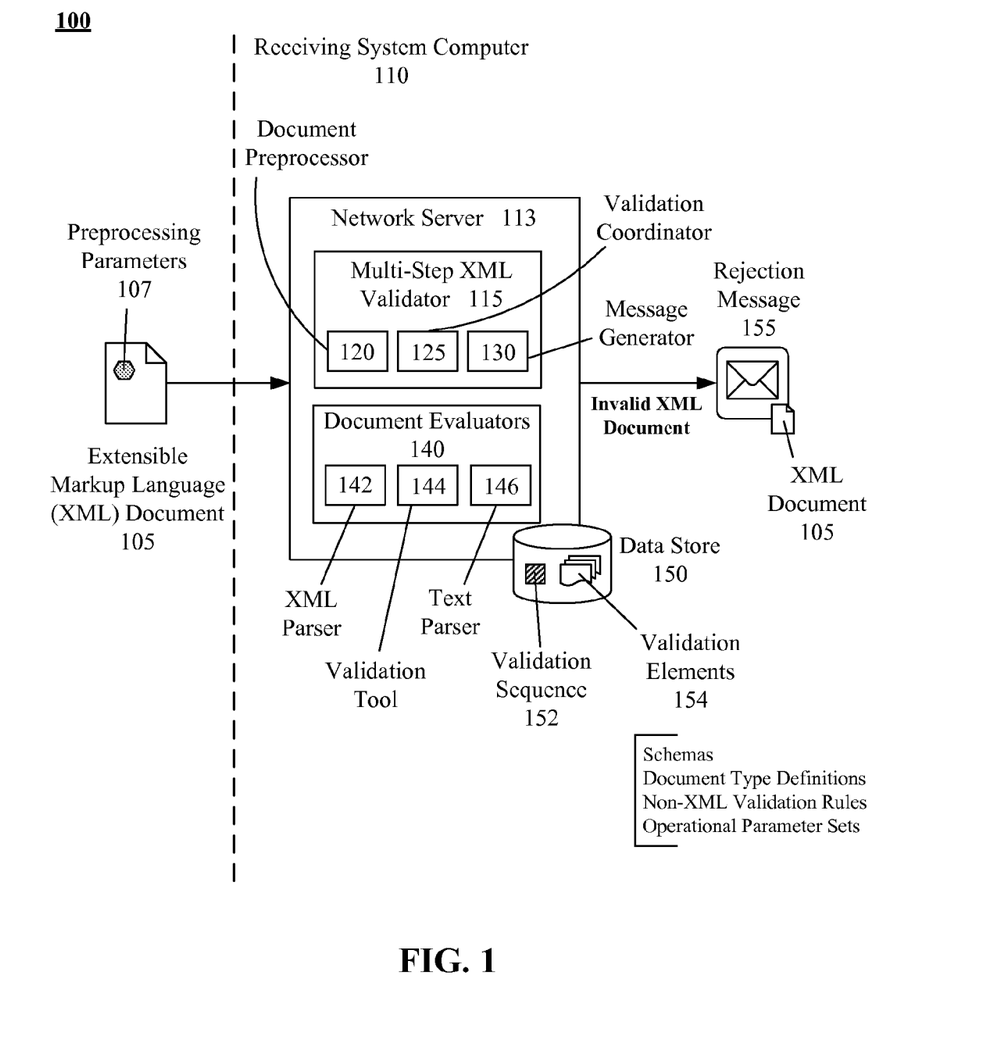
FIG. 1 is a schematic diagram illustrating a system for validating extensible markup documents (XML) using a multi-step technique in accordance with embodiments of the inventive arrangements disclosed herein.

FIG. 1 is a schematic diagram illustrating a system 100 for validating extensible markup documents (XML) 105 using a multi-step technique in accordance with embodiments of the inventive arrangements disclosed herein. In system 100, the validation of an XML document 105 by a receiving computer system 110 can be optimized by using a multi-step XML validator 115 in conjunction with various document evaluators 140.

The XML document 105 can be a conveyance element of a data exchange between a generating computer application and/or system (not shown) and a receiving computer system 110, of which the network server 113 is a component.

It should be noted that the focus of the present invention is upon the validation of the XML document 105 when received by the receiving computer system 110, and, as such, only components involved with this specific process are illustrated in FIG. 1. Further, it is presumed that the conveyance of the XML document 105 to the receiving computer system 110 is performed utilizing data transfer protocols compliant with all systems involved. Although the validate 115 is shown as residing within a single network server 113, it is contemplated that different validation actions or steps in a validation sequence can be conducted by different communicatively linked computing devices. Thus, a receiving server 113 can actually refer to a set of servers disposed between a sending and a receiving device. Thus, the "receiving device" 113 that performs one or more XML validation actions can be implemented in middleware (e.g., a Web service implementation) and/or can be implemented within a terminal communication node to which the XML document is to be delivered. An ability to utilize multiple different devices during a validation sequence makes the disclosed solution a highly scalable one.

In system 100, to perform the validation of a received XML document 105, the receiving computer system 110 (or systems) can utilize a network server 113 containing a multi-step XML validator 115, one or more document evaluators 140, and a data store 150 containing supplementary data items. The network server 115 can represent a computing device configured for the operation of the multi-step XML validator 115 and document evaluators 140 as well as access data store 150. In an alternate embodiment, the data store 150 can be remotely located from network server 113 and accessible over a network (not shown).

The multi-step XML validator 115 can be a software application designed to optimally validate XML documents 105 utilizing a multi-step technique. To perform this function, the multi-step XML validator 115 can include a document preprocessor 120, a validation coordinator 125, and a message generator 130.

Upon invocation of the multi-step XML validator 115, the validation coordinator 125 can begin the validation process of the XML document 105. In order to determine how to validate the XML document 105, the validation coordinator 125 can utilize data extracted by the document preprocessor 120.

The document preprocessor 120 can be a component of the multi-step XML validator 115 that can identify unique characteristics of the XML document 105, characteristics of the communicators exchanging the XML document 105, and/or characteristics of the transaction through which the XML document 105 is exchanged. In one embodiment, the XML document can include one or more user-configured preprocessing parameters 107. The preprocessing parameters 107 can represent the data tags and/or values within the XML document 105 that a user has configured the document preprocessor 120 to ascertain.

Examples of preprocessing parameters 107 can include, but are not limited to, the originating party, the type of data the XML document 105 contains, the version of XML used to author the document 105, and the like. In one embodiment, one or more of the preprocessing parameters 107 can be automatically determined and written to the XML document. In another embodiment, one or more parameters listed in system 100 as preprocessing parameters 107 can be stored in a companion document to document 105 or can be dynamically determined by the server 113 or valuator 115. Thus, the preprocessing parameters 107 can be used to generically represent the data used by system 100 to determine which validation actions are to be applied to a given XML document 105.

The preprocessing parameters 107 can be used by the multi-step XML validator 115 to direct the validation of the XML document 105. In order to determine the preprocessing parameters 107, the document preprocessor 120 can utilize a document evaluator 140. For example, the document preprocessor 120 can use the text parser 146 to efficiently scan the XML document 105 for the words of the preprocessing parameters 107.

Once the preprocessing parameters 107 have been obtained, the document preprocessor 120 can provide the parameters 107 to the validation coordinator 125. Additionally, the document preprocessor 120 can also inform the validation coordinator 125 when there is a lack of one or more of the preprocessing parameters 107 within the XML document 105.

The validation coordinator 125 can represent a component of the multi-step XML validator 115 that can manage the validation of the XML document 105. The validation coordinator 125 can utilize the data provided by the document preprocessor 120 to determine the steps required to validate the XML document 105. Missing preprocessing parameters 107 can be interpreted as the XML document 105 being invalid by the validation coordinator 125, which can indicate that additional validation is unnecessary.

The steps for validating the XML document 105 can be represented by a validation sequence 152. Each step can correspond to the execution of a specific validation element 154 by a document evaluator 140 upon the XML document 105. The validation coordinator 125 can determine the appropriate validation sequence 152 to use for the XML document 105 based upon the preprocessing parameters 107.

The validation sequence 152 can be dynamically generated by the validation coordinator 125 by determining and ordering the validation elements 154 that match the preprocessing parameters 107. In an alternate embodiment, the validation coordinator 125 can use the preprocessing parameters 107 to select the appropriate validation sequence 152 from a set of pre-generated validation sequences 152.

Validation elements 154 can represent a variety of governances for validating the XML document 105, including, but not limited to, XML schemas, document type definitions (DTDs), rules and/or parameters for auxiliary validation tools 144, operational parameter sets, and the like. For example, the validation sequence 152 for a purchase order 105 received from ABC Manufacturing can outline a first step of using an XML parser 142 for validation against a generic purchase order XML schema 154 and the last step of using an XML parser 142 for validation against the ABC purchase order XML schema 154 and a "RESTART" command for every line item 154.

It should be noted that representing the multiple steps of the validation sequence 152 as executions of validation elements 154 provides the ability to have varying degrees of validation applied to XML documents 105. For example, the validation sequence 152 for a purchase order 105 received from XYZ Company can include only the use of the generic purchase order XML schema 154 because they place infrequent and small orders, whereas ABC Manufacturing places large, complicated orders that require additional attention.

The execution a validation elements 154 by the validation coordinator 125 can require the use of one or more document evaluators 140. A document evaluator 140 can represent a software application that performs a specific function required to determine the conformance of the XML document 105 to a specific validation element 154. An XML parser 142, a commercially-available validation tool 144, and a text parser 146 can be examples of document evaluators 140 that can be used by the multi-step XML validator 115.

In another embodiment, the document evaluators 140 can be integrated components of the multi-step XML validator 115. In yet another embodiment, the document evaluators 140, as a group or individually, can be located remotely from the multi-step XML validator 115 and accessed via a network (not shown).

As the validation coordinator 125 executes the validation sequence 152, a failure of a validation element 154 can occur. Using the above example, the XML document 105 can be determined to be invalid when checked against the designated XML schema 154. In the event of a failure of a validation element 154, the validation coordinator 125 can terminate the execution of the validation sequence 152.

It is important to emphasis the impact of this capability within the execution of the validation process. Using this technique, the validation of the XML document 105 can be terminated at the earliest sign of invalidity, which can be determined as before the actual validating process begins. Thus, additional and unnecessary validation tests will not be performed, saving time, computing resources, and providing faster customer feedback.

When an XML document 105 is determined to be invalid, the validation coordinator 125 can utilize a message generator 130 to create a rejection message 155. The message generator 130 can include details about the type of failure encountered in the rejection message 155. Additionally, the XML document 105 can be included with the rejection message 155. The rejection message 155 can be sent back to the originator of the XML document 105 via the means available by the receiving computer system 110. For example, the rejection message 155 can be sent in an email message with the XML document 105 included as an attachment.

If the validation sequence 152 is executed without encountering a failure, then the validation coordinator 125 can indicate the validity of the XML document 105 to receiving computer system 110. It should be noted that specific means of indicating the validity is dependent upon the implementation of the multi-step XML validator 115 within the overall receiving computer system 110.

As used herein, presented data store, including store 150, can be a physical or virtual storage space configured to store digital information. Data store 150 can be physically implemented within any type of hardware including, but not limited to, a magnetic disk, an optical disk, a semiconductor memory, a digitally encoded plastic memory, a holographic memory, or any other recording medium. The data store 150 can be a stand-alone storage unit as well as a storage unit formed from a plurality of physical devices. Additionally, information can be stored within data store 150 in a variety of manners. For example, information can be stored within a database structure or can be stored within one or more files of a file storage system, where each file may or may not be indexed for information searching purposes. Further, data store 150 can utilize one or more encryption mechanisms to protect stored information from unauthorized access.

Figure 2:
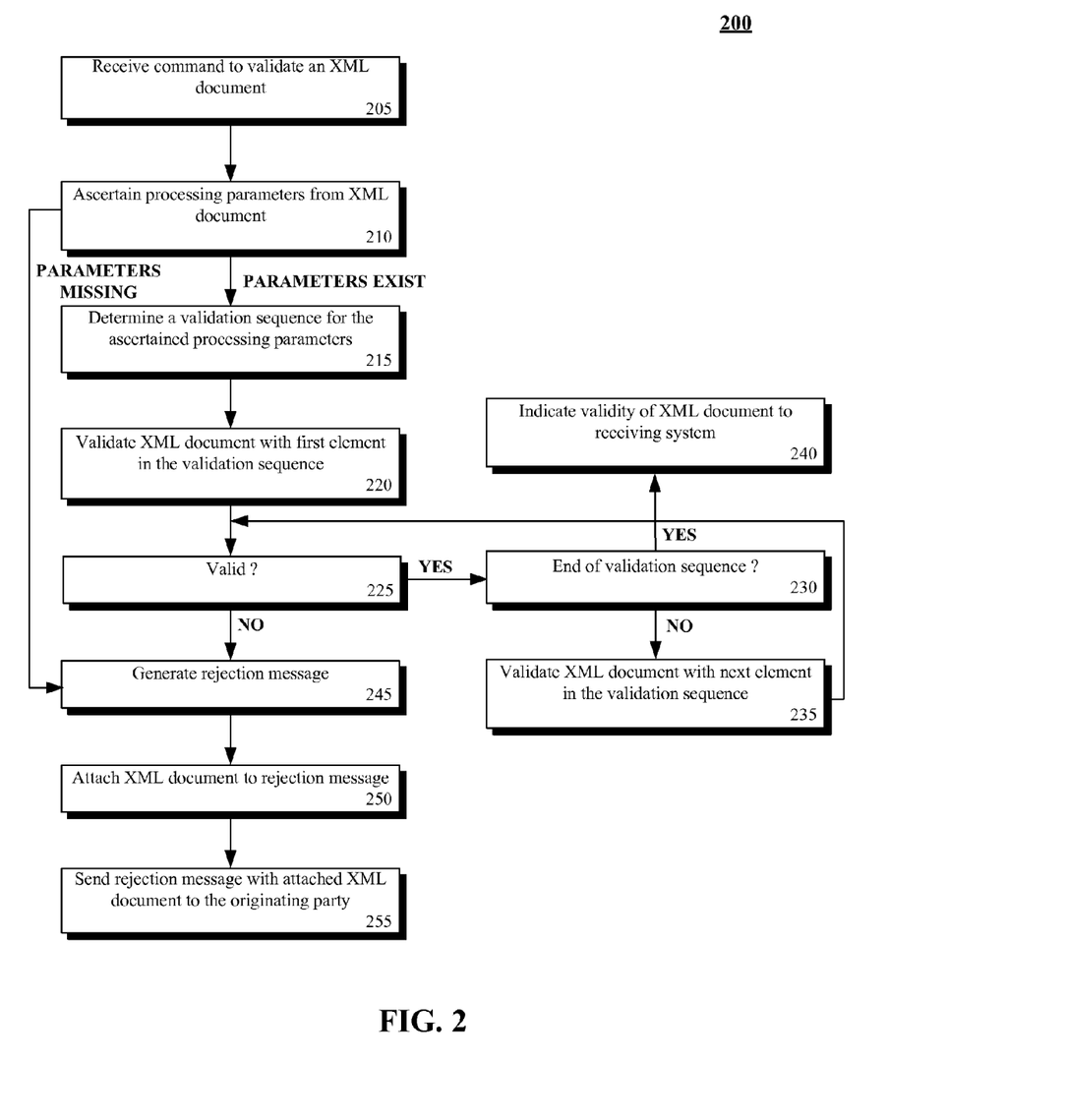
FIG. 2 is a flow chart of a method for validating of extensible markup language (XML) documents using a multi-step validation process in accordance with an embodiment of the inventive arrangements disclosed herein.

FIG. 2 is a flow chart of a method 200 for validating of extensible markup language (XML) documents using a multi-step validation process in accordance with an embodiment of the inventive arrangements disclosed herein. Method 200 can be performed in the context of system 100 or any other system supporting the use of a multi-step technique to optimize the validation of XML documents.

Method 200 can begin with step 205 where a multi-step XML validator can receive a command to validate an XML document. In step 210, a set of preprocessing parameters can be ascertained from the XML document.

When the preprocessing parameters exist for the XML document, step 215 can execute where a validation sequence can be determined for the XML document based on the preprocessing parameters. The first element in the validation sequence can be used to validate the XML document in step 220.

The validity of the XML document in regards to the validation element can be determined in step 225. When the XML document is determined to be valid for the validation element, step 230 can execute where it can be determined if the end of the validation sequence has been reached.

When the end of the validation sequence has been reached, the validity of the XML document can be indicated to the receiving system in step 240. When the end of the validation sequence has not been reached, then step 235 can be executed where the XML document can be validated with the next element in the validation sequence. Upon completion of step 235, flow can return to step 225 where the validity of the XML document is determined for the next validation element.

When the XML document is found to be invalid in step 225 or the preprocessing parameters are determined to be missing in step 210, then the flow of method 200 can proceed to step 245 where a rejection message can be generated for the XML document.

In step 250, the XML document can be optionally attached to the rejection message. The rejection message can be sent to the originating party of the XML document in step 255.

It should be emphasized that the validation elements (or validation actions) that are conducted during the validation sequence can be designed to ensure minimal redundancy in actions occurs during the validation sequence. For example, once a first validation element determines that a given XML document is in a valid XML format, no subsequent validation element need repeat that step. Further, each validation element can represent a "level" of validation of an XML document. Each level in a validation hierarchy (validation sequence) can focus on level specific concerns.

As previously mentioned, validation elements need not be executed within a single computing device. When different devices are used for different ones of the validation elements, results from previous validation elements can be recorded within the XML document in metadata or special structural fields reserved for this purpose or can be otherwise conveyed from one computing device to another.

When speed of validating an XML document is important, it can be situationally beneficial to concurrently and independently execute validation actions. For example, a first processor and set of computing resources can execute programmatic actions associated with a first validation element at a same time that a second processor and set of computing resources execute programmatic actions associated with a second validation element. Validation elements results from out-of-order execution of a validation sequence can still produce an informative and true validation result. Thus, if a second validation element in a sequence of validation elements produces results indicating an XML document is invalid, then all other programmatic actions in the validation sequence (including programmatic actions for a first validation element if not already completed) can be terminated early or need not be performed at all.

Figure 3:
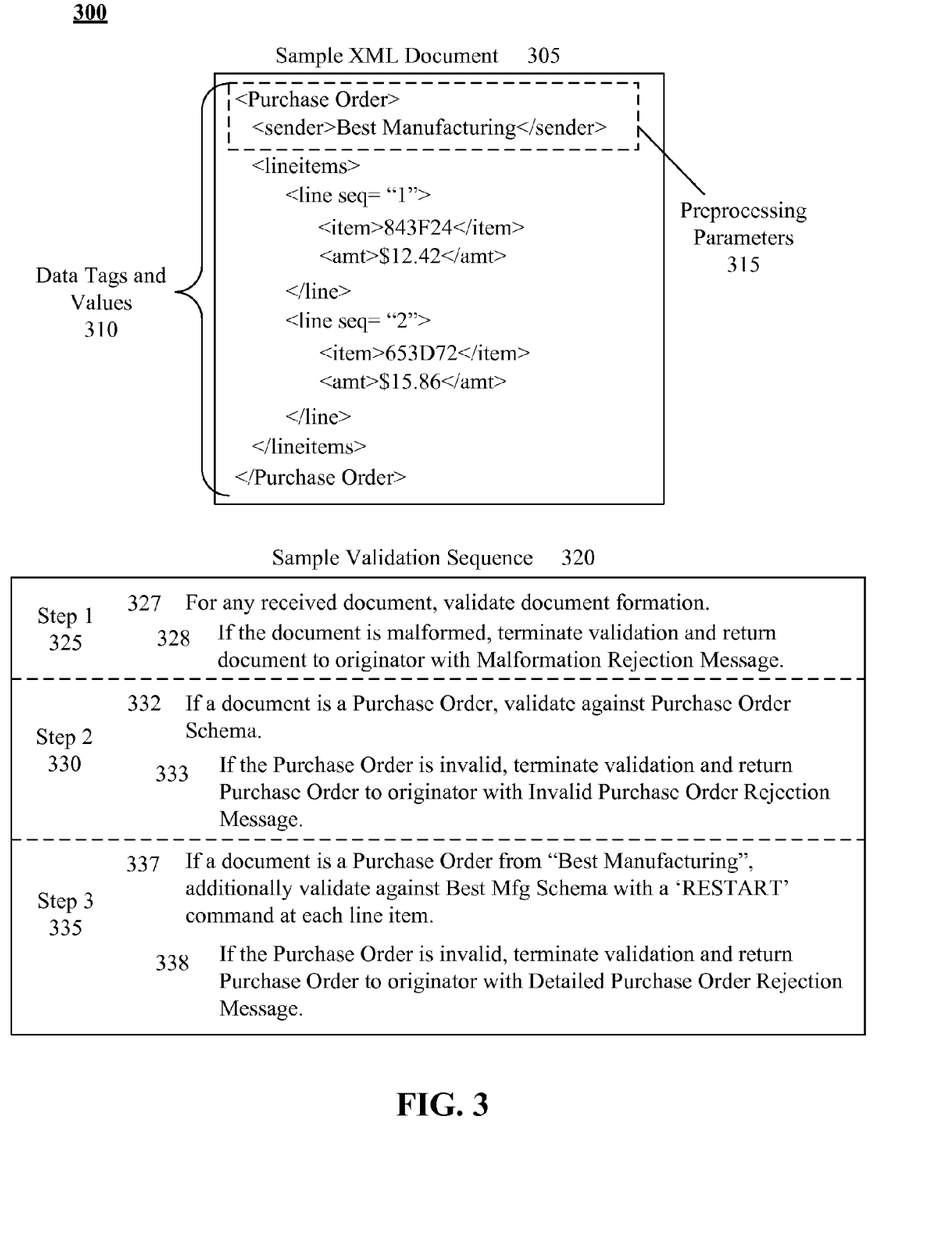
FIG. 3 is a collection depicting a sample extensible markup language (XML) document and a corresponding sample validation sequence in accordance with an embodiment of the inventive arrangements disclosed herein.

FIG. 3 is a collection 300 depicting a sample extensible markup language (XML) document 305 and a corresponding sample validation sequence 320 in accordance with an embodiment of the inventive arrangements disclosed herein. The sample items 305 and 320 can be utilized within the context of system 100 and/or method 200. It should be noted that the contents of the sample items 305 and 320 used in this example 300 are for illustrative purposes only, and are not meant to represent or limit an implementation of the present invention.

The sample XML document 305 can contain a variety of data tags and data values as allowed by the XML standard. Of particular note within the sample XML document 305 are the data tags and values 310 identified as preprocessing parameters 315. These preprocessing parameters 315 can be used by a multi-step XML validator to determine the sample validation sequence 320 for the sample XML document 305.

It should be noted that the sample validation sequence 320 shown in this example 300 is expressed in plain verbiage like pseudo code, for the sake of clarity and understanding. Since a validation sequence is intended to be executed by computing device, an implemented validation sequence would be written using the proper language for interpretation by the multi-step XML validator.

As shown in this example 300, the sample validation sequence 320 can include multiple steps 325, 330, and 335. Each step 325, 330, and 335 can represent the execution of one or more validation elements upon the sample XML document 305. The inclusion of these steps 325, 330, and 335 can be based upon the values of the preprocessing parameters 315 and the execution criteria of each step 325, 330, and 335.

In this example step one 325 can consist of two statements 327 and 328. Statement 327 can stipulate that the formation of every received XML document, such as the sample XML document 305, is to be validated. Statement 328 can describe handling the failure of statement 327 by terminating the validation process and returning the XML document to its originator with a rejection message indicating that the document is malformed.

Upon the successful execution of step one 325, step two 330 can be executed, consisting of statements 332 and 333. Statement 332 can dictate that a received XML document identified as a purchase order is to be validated against the purchase order schema. In this example 300, the sample XML document 305 contains a data tag 310 that is identified as a preprocessing parameter 315 that indicates that the sample XML document 305 is a purchase order. Therefore, step two 330 is applicable for the validation of the sample XML document 305 and is included in the sample validation sequence 320.

Statement 333 can describe handling the failure of statement 332 by terminating the validation process and returning the XML document to its originator with a rejection message indicating that the document is an invalid purchase order.

When step two 330 is successful, step three 335 can be executed, consisting of statements 337 and 338. Statement 337 can state that a purchase order received from "Best Manufacturing" is to be additionally validated against the Best Mfg schema. In addition to using the Best Mfg schema, a 'RESTART' command is to be inserted at the beginning of each line item contained in the purchase order.

In this example 300, the sample XML document 305 contains a data tag and value 310 that is a preprocessing parameter 315 identifying the sample XML document 305 as a purchase order from Best Manufacturing. Therefore, step three 335 is applicable for the validation of the sample XML document 305 and is included in the sample validation sequence 320.

Statement 338 can describe handling the failure of statement 337 by terminating the validation process and returning the XML document to its originator with a detailed rejection message for an invalid purchase order.

The diagrams in FIGS. 1-3 illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:
1. A method for validating XML documents comprising:
    determining a set of preprocessing parameters from an XML document, wherein responsive to any missing preprocessing parameter in the set of preprocessing parameters, determining the XML document to be invalid, wherein a result of determining that the XML document is invalid causes a ceasing of activities related to validation, wherein the preprocessing parameters represent at least one of data tags and values within the XML docu- ment, and wherein the preprocessing parameters represent at least one of data tags and values within the XML document;

upon determining the set of preprocessing parameters, identifying a validation sequence from a plurality of validation sequences for the XML document based on the set of preprocessing parameters, wherein each of the validation sequence comprises a unique order of execution for series of validation passes to validate the XML document, wherein said validation sequence comprises a plurality of validation elements, wherein each validation pass corresponds to one of the validation elements, wherein each of the validation element represents a type of governance for validating the XML document, wherein each validation pass is configured to validate the XML document for at least one condition defined by the validation element; and perform a multi-pass validation associated with the validation sequence on the XML document; and producing a validation element result for each performed validation pass.

2. The method of claim 1, further comprising:
reporting a validation status of the XML document over a network to an originator of the XML document from a remotely located network node based upon results of the validation sequence.

3. The method of claim 1, wherein said at least one validation pass comprises a plurality of validation passes, and wherein at least two different computer processing units perform different ones of the validation passes of the plurality of validation passes.

4. The method of claim 1, wherein the validation elements are ordered elements, and wherein the validation passes are performed in an order of the validation elements.

5. The method of claim 1, wherein each of said validation elements define validation conditions unique to that validation element, wherein the defined validation conditions are non-redundant with any other validation condition of the validation sequence, wherein a validation element result that indicates the XML document is invalid causes a ceasing of activities related to unprocessed ones of the validation elements in the validation sequence, wherein a validation element result that indicates the XML document is valid causes a validation pass to be performed for another one of the validation elements unless each validation element in the validation sequence has been processed, wherein a successful validation of the XML document requires a performance of a successful execution pass for each of the plurality the validation elements.

6. The method of claim 1, wherein at least one of the validation elements are user configurable, and wherein each of the validation elements are separately configurable from other ones of the validation elements.

7. The method of claim 1, further comprising:
analyzing the XML document using a text parser; and
determining said validation sequence from a plurality of previously defined validation sequences based upon results of analyzing the XML document using the text parser.

8. The method of claim 1, further comprising:
determining said validation sequence based upon a relationship between a sender of the XML document and a recipient of the XML document.

9. The method of claim 1, said performing further comprising:
analyzing the XML document using an XML parser, wherein the conditions defined by the validation element are structural XML conditions defined within an XML schema.

10. A computer program product for validating XML documents, the computer program product comprising:
a non-transitory computer usable storage medium having computer usable program code embodied therewith, the computer usable program code comprising:
computer usable program code configured to determine a set of preprocessing parameters from an XML document, wherein responsive to any missing preprocessing parameter in the set of preprocessing parameters, identifying the XML document to be invalid, wherein a result of identifying that the XML document is invalid causes ceasing of activities related to validation, wherein the preprocessing parameters represent at least one of data tags and values within the XML document;
computer usable program code configured to, upon determining, identify a validation sequence for an XML document based on the set of preprocessing parameters, wherein the validation sequence comprises an order of execution for series of validation passes to validate the XML document, wherein said validation sequence comprises a plurality of validation elements, wherein each validation pass corresponds to one of the validation elements, wherein each of the validation element represents a type of governance for validating the XML document, wherein each validation pass is configured to validate the XML document for at least one condition defined by the validation element;
computer usable program code configured to perform the validation sequence, comprising the series of validation passes, on the XML document; and
computer usable program code configured to produce a validation element result for each performed validation pass, wherein a validation element result that indicates the XML document is invalid causes a ceasing of activities related to unprocessed ones of the validation elements in the validation sequence, wherein a validation element result that indicates the XML document is valid causes a validation pass to be performed for another one of the validation elements unless each validation element in the validation sequence has been processed, wherein a successful validation of the XML document requires a performance of a successful execution pass for each of the plurality the validation elements.

11. A method that utilizes a multi-pass technique to validate extensible markup language (XML) documents comprising:
receiving an XML document containing a plurality of data items, wherein the plurality of data items are arranged in a predetermined format for an exchange of data;
ascertaining a set of processing parameter from the XML document, wherein responsive to any missing preprocessing parameter in the set of preprocessing parameters, determining that the XML document to be invalid, wherein a result of determining that the XML document is invalid causes a ceasing of activities related to validation, and wherein the preprocessing parameters represent at least one of data tags and values within the XML document;
upon determining the set of preprocessing parameters, determining a validation sequence for the XML document from a plurality of different validation sequences, wherein the validation sequence is determined based at least in part upon the set of processing parameters, wherein each of the validation sequence comprises a unique order of execution for a series of validation passes, wherein the validation sequence comprises a plurality of validation elements that each defines acceptable data items for at least one of the predetermined format and for the exchange of data, wherein each validation pass is configured to validate the XML document for a condition defined by the validation element; and executing the series of validation passes associated with the validation sequence upon the XML document, wherein during the execution, a validation pass for each validation element is executed in order.

12. The method of claim 11, further comprising:
when a failure of a specific validation element occurs during an execution of the validation sequence, immediately terminating the execution of the validation sequence and determining the XML document to be invalid;
when each validation element has been processed and determined to be valid, determining the XML document to be valid; and
conveying message detailing validation results for the XML document to an originating party of the XML document.

13. The method of claim 12, wherein the examining step is performed by a document preprocessing component, wherein the document preprocessing component utilizes a text parser to determine the at least one processing parameter.

14. The method of claim 12, wherein the at least one processing parameter comprises a document data type, the originating party of the XML document, and an XML version identifier.

15. The method of claim 11, wherein the plurality of validation elements comprises at least one of an XML document schema, a document type definition, a validation rule for a commercially-available validation tool, and an XML processing parameter.

16. A system utilizing a multi-pass technique to optimize the validation of extensible markup language (XML) documents comprising:
an XML document containing a plurality of data items, wherein the plurality of data items are arranged in a predetermined format for an exchange of data;
a document preprocessor configured to analyze the XML document for a set of preprocessing parameters;
a validation coordinator configured to identify the XML document as an invalid document in response to determining that one or more preprocessing parameters of the set of preprocessing parameters are missing;
upon determining the set of preprocessing parameters, identifying determine the validation sequence for the XML document based upon the at least one preprocessing parameter determined by the document preprocessor and monitor an execution of said validation sequence; and
a multi-pass XML validator configured to validate the XML document utilizing a multi-pass validation associated with a validation sequence, wherein the validation sequence contains an order of execution for a series of validation passes, wherein the validation sequence comprises a plurality of validation elements that each defines acceptable data items for at least one of the predetermined format and for the exchange of data, wherein each validation pass corresponds to one of the validation elements, wherein each validation pass is configured to validate the XML document for a condition defined by the validation element; and
at least one document evaluator configured to execute the validation sequence upon the XML document as directed by the multi-pass XML validator.

17. The system of claim 16, wherein the multi-pass XML validator further comprises:
a message generator configured to create a rejection message upon a failure of a validation element within the validation sequence, wherein the rejection message is conveyed to an originating party of the XML document.

18. The system of claim 17, wherein the at least one preprocessing parameter determined by the document preprocessor comprises at least one of a document data type, an originating party of the XML document, and an XML version identifier.

19. The system of claim 15, wherein the at least one document evaluator comprises an XML parser, a text parser, and a commercially-available validation tool.

20. The system of claim 15, wherein the at least one validation element comprises at least one of an XML document schema, a document type definition, a validation rule for a commercially-available validation tool, and an XML processing parameter.

* * * * *